United States Patent [19]

Campbell, Jr.

[11] Patent Number: 4,493,502
[45] Date of Patent: Jan. 15, 1985

[54] CAR BODY GUARD

[76] Inventor: Valtin T. Campbell, Jr., P.O. Box 016777, Miami, Fla. 33101

[21] Appl. No.: 529,526

[22] Filed: Sep. 6, 1983

[51] Int. Cl.³ .............................................. B60R 19/00
[52] U.S. Cl. .................................... 293/128; 293/124; 293/141; 296/207; 280/770; 267/140
[58] Field of Search ..................... 293/1, 102, 126–128, 293/124, 141; 296/98, 136, 207; 280/770, 153 A, 153 B; 267/140; 40/591, 603, 604

[56] References Cited
U.S. PATENT DOCUMENTS

| | | | |
|---|---|---|---|
| 3,540,773 | 11/1970 | Settle, Jr. et al. | 293/1 |
| 3,563,594 | 2/1971 | London | 293/1 |
| 3,596,962 | 8/1971 | Hertzell | 293/1 |
| 4,234,222 | 11/1980 | Bays | 293/124 |

Primary Examiner—David A. Scherbel
Assistant Examiner—Dennis H. Pedder
Attorney, Agent, or Firm—Oltman and Flynn

[57] ABSTRACT

A car body guard comprising a flexible rubber strap rolled up in a housing which is mounted in one of the wheel wells of the car. The strap may be unwound from the housing and extended across the side of the car and its free end fastened to an attachment member in the other wheel well on that side of the car. A return spring holds the strap taut along the side of the car and rolls it up again in the housing after it is detached from the attachment member in the other wheel well.

9 Claims, 6 Drawing Figures

U.S. Patent    Jan. 15, 1985    4,493,502
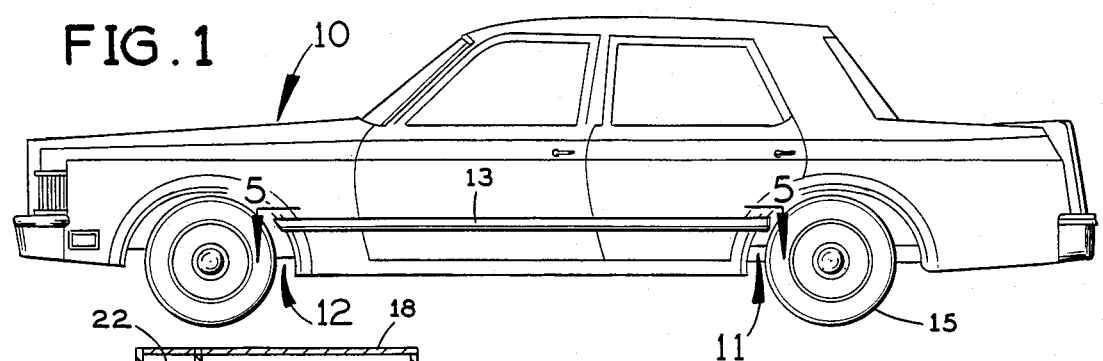
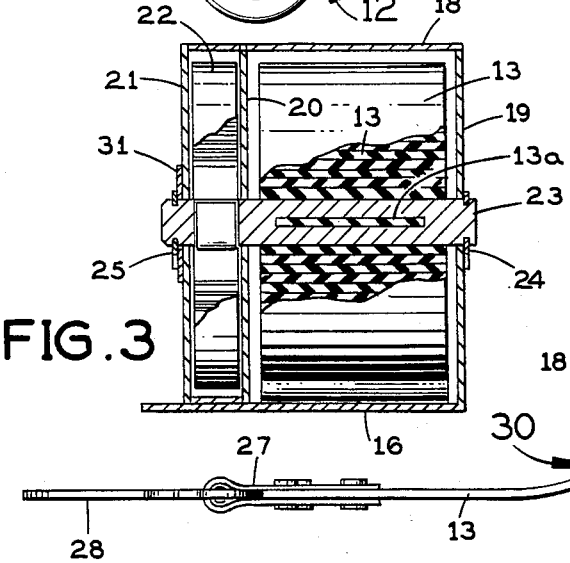
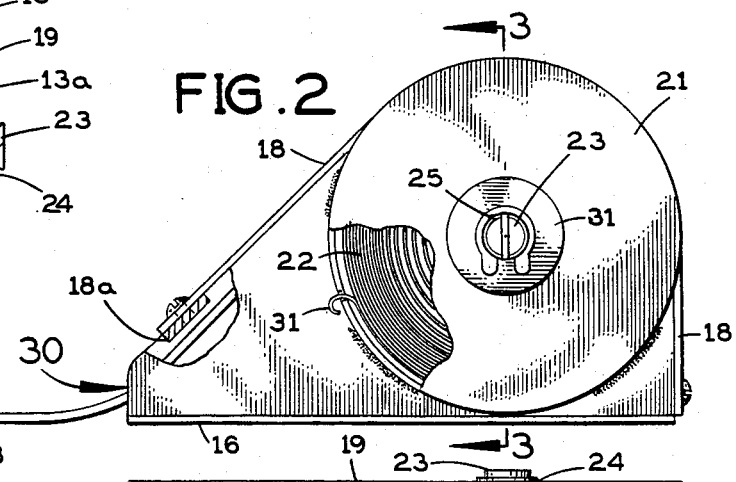
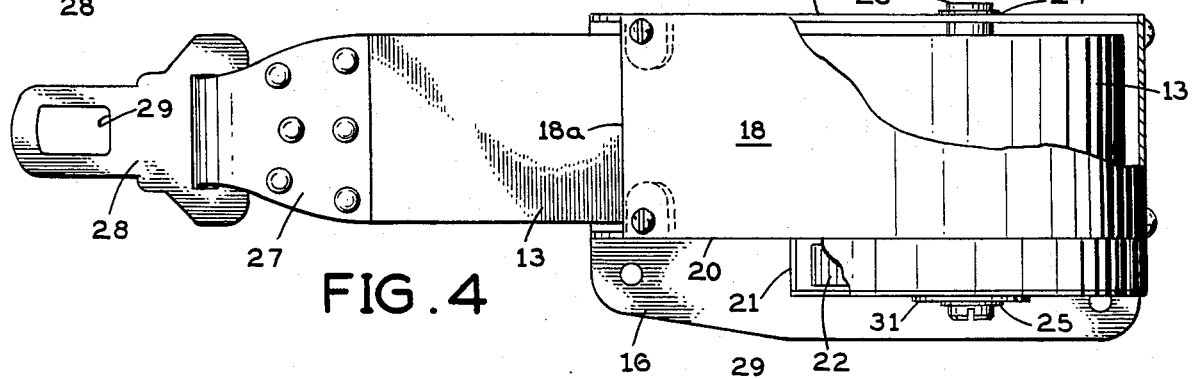
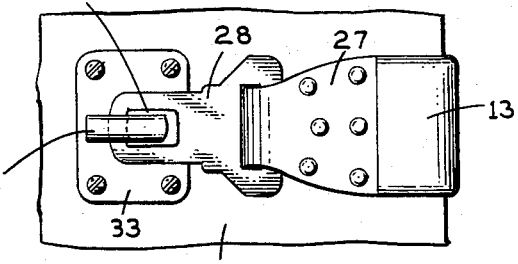
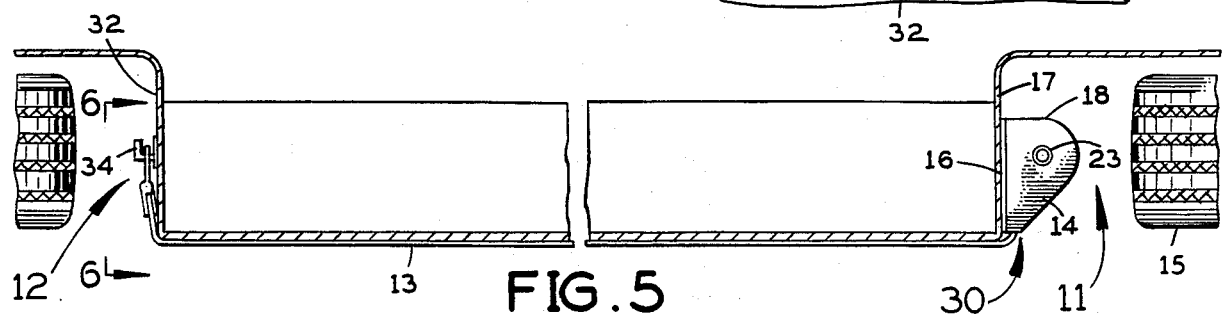

CAR BODY GUARD

SUMMARY OF THE INVENTION

This invention relates to a car body guard for protecting the side of a passenger car.

A car parked in a parking lot or garage is vulnerable to damage by a person who carelessly opens the door of a vehicle in the next parking space. The edge of the vehicle door being opened may strike the door or some other part of the side of the car parked next to it. Usually, the contact by the vehicle door being opened occurs in a predictable, vertically narrow area along the side of the car which it strikes, depending upon the latter's cross-sectional profile and the shape of the door which strikes it.

The present invention relates to a novel car body guard having a flexible strap which is stored in a rolled-up condition in a housing mounted in one of the wheel wells of the car. After the driver parks the car, he or she can unroll the strap and attach its free end to an attachment member mounted in the other wheel well on the same side of the car. In this position the strap extends across this side of the car body between the front and rear wheel wells at the level where it is most vulnerable to being damaged by the opening of the door of a vehicle in the next parking space on that side. A return spring in the housing keeps the strap in a taut condition along the side of the car. Both sides of the car can be protected by individual straps. When the driver returns to the parked car, he or she detaches the free end of the strap and it is rolled up into its housing by the return spring.

A principal object of this invention is to provide a novel arrangement for protecting the side of a parked car against being damaged by the door of a vehicle parked next to it.

Another object of this invention is to provide such a protective arrangement having a flexible strap which is stored in a rolled-up condition in an out-of-the-way position on the car and can be conveniently unrolled to its protective position after the driver parks the car.

Further objects and advantages of this invention will be apparent from the following detailed description of a presently preferred embodiment which is illustrated schematically in the accompanying drawing.

DESCRIPTION OF THE DRAWING

FIG. 1 is a side elevation showing a passenger car with the present body guard positioned to protect the doors and part of the front fender on one side of a four door car;

FIG. 2 is a top plan view of the present car body guard showing the protective strap retracted and with part of its housing broken away for clarity;

FIG. 3 is a cross-section taken along the line 3—3 in FIG. 2;

FIG. 4 is a side elevation of the car body guard as shown in FIG. 2;

FIG. 5 is a longitudinal horizontal section taken along the line 5—5 in FIG. 1; and FIG. 6 is a fragmentary elevation taken along the line 6—6 in FIG. 5 and showing the free end of the strap releasably fastened to the car body.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Referring to FIG. 1, the present car body guard is shown in its operative position on one side of a four-door passenger car 10 having a rear wheel well 11 and a front wheel well 12 on this side. The body guard comprises a flexible strap 13 of rubber belting which in one practical embodiment is 3 inches wide, ¼ inch thick and 12 feet long.

While the car is being driven the strap 13 is wound up in a roll inside a housing 14 (FIG. 5) which is mounted in the rear wheel well 11 in front of the rear wheel 15 on this side of the car. The strap housing 14 has a flat front wall 16 which is bolted or otherwise rigidly attached to the front 17 of the rear wheel well. Housing 14 has a vertical rear wall 18 which extends perpendicularly rearward from the laterally inward end of its front wall 16 and then curves laterally outward and through a circular arc of about 135 degrees and then continues straightforward and laterally outward at an angle of about 45 degrees to its front wall 16, terminating in a straight edge 18a spaced from wall 16. The housing has flat, horizontal, top and bottom walls 19 and 20 (FIG. 4) joined to its front and rear walls 16 and 18 and extending between them. Between the outer edge 18a of the rear wall, the front wall 16, and the top and bottom walls 19 and 20 the housing defines an opening at 30 which passes the strap 13.

A cylindrical enclosure 21 for a spiral return spring 22 of flat cross-section is rigidly fastened to the bottom wall 20 of the strap housing, as best seen in FIG. 3.

A vertical shaft 23 is rotatably mounted in the strap housing and the spring enclosure 21, as shown in FIG. 3. Snap rings 24 and 25 hold this shaft at the top wall 19 of the strap housing and the bottom wall of spring enclosure 21. A flat annular metal washer 31 is engaged between snap ring 25 and the bottom wall of spring enclosure 21.

The protective strap 13 is closely wound in a spiral roll on shaft 23, with its inner end anchored tightly in the shaft, as shown at 13a in FIG. 3. From this roll the strap extends out through the housing opening at 30. A fabric loop 27 is fixedly attached to the free end of strap 13 and it holds a metal fastener element in the form of a flat rigid plate 28 having a rectangular opening 29 for receiving an attachment member mounted on the rear wall of the front wheel well 12.

The return spring 22 is wound in a spiral, with its inner end attached to shaft 23 and its outer end bent into a hook 31 (FIG. 2) seated in an opening in the cylindrical side wall of the spring enclosure 21. As the belt 13 is pulled out of the housing, it rotates the shaft 23 in a direction which causes the spiral spring 22 to be wound up more and more tightly. Consequently, whenever the free end of belt 13 is released, the spring 22 will tend to unwind and in doing so it will rotate shaft 23 in the opposite direction, causing it to pull the belt 13 back into the housing.

As shown in FIGS. 5 and 6, the front wheel well 12 on this side of the car has a forwardly-facing rear wall 32 to which is bolted a flat plate 33 carrying a right-angled hook 34. The opening 29 in the plate 28 on the free end of belt 13 can be slipped over this hook to releasably fasten the free end of the belt in place there.

In the use of this car body guard, except when the vehicle is parked the strap 13 will be rolled up in its housing in the rear wheel well 11. After parking the car, the driver can grasp the plate 28 on the free end of the strap 13 and pull it forward along the side of the car to the front wheel well 12, where it may be slipped over the hook 34. The return spring 22 will hold the strap 13 in a taut condition along the side of the car, where it is positioned to protect the car from being struck by a carelessly opened door of a vehicle in the next parking space on that side.

If desired, the housing for the strap may be mounted in the front wheel well and the hook 34 in the rear wheel well of the vehicle.

I claim:

1. A car body guard comprising:
   an elongated flexible strap wound up in a roll;
   a housing enclosing the rolled-up strap and having an opening for passing said strap, said housing being shaped and dimensioned to be mounted in a wheel well on one side of the car body;
   a fastener element on the outer end of said strap outside said housing to be grasped manually and pulled along said one side of the car body and attached to an attachment member in the other wheel well on that side of the car body;
   and means for retracting the strap into said housing to a rolled-up condition upon separation of said fastener element from said attachment member in the other wheel well.

2. A car body guard according to claim 1, wherein said strap is of rubber-like material.

3. A car body guard according to claim 1, wherein said means for retracting the strap is a spring operatively coupled to said strap to be stressed as the strap is unwound and relaxed as the strap is rolled up.

4. A car body guard according to claim 3, wherein said strap is of rubber-like material.

5. A car body guard according to claim 1, wherein said means for retracting the strap is a spiral spring operatively coupled to the strap to be tightened as the strap is unwound from said housing and to maintain the strap taut against the side of the car when said fastener element is attached to said attachment member in said other wheel well.

6. In combination with an automotive vehicle having a body with a rear wheel well and a front wheel well on one side, a vehicle body guard comprising:
   a housing mounted in one of said wheel wells;
   an elongated flexible strap wound up in a spiral roll in said housing;
   said housing having an opening which passes said strap;
   a fastener element on the outer end of said strap outside said housing to be grasped manually and pulled along that side of the car to the other of said wheel wells so as to unwind said strap and extend it along the side of the vehicle;
   an attachment member mounted in said other wheel well for engagement by said fastener element;
   and spring means at said housing operatively coupled to said strap to hold the latter taut along the side of the vehicle when said fastener element engages said attachment member and to retract said strap into the housing when said fastener element is disengaged from said attachment member.

7. The combination of claim 6, wherein said strap is of rubber-like material.

8. The combination of claim 6, wherein:
   said fastener element on the outer end of the strap is a plate with an opening therein;
   and said attachment member is a hook mounted in said other wheel well.

9. The combination of claim 6, wherein:
   said spring means is a spiral spring operatively coupled to said strap to be tightened as the strap is unwound from the housing;
   said strap is a belt of rubber-like material;
   said fastener element on the outer end of the strap is a plate with an opening therein;
   and said attachment member is a hook mounted in said other wheel well.

* * * * *